United States Patent [19]

Herchenbach

[11] 4,338,797
[45] Jul. 13, 1982

[54] TRISHAFT TELESCOPING ASSEMBLY FOR TORQUE TRANSMISSION

[75] Inventor: Paul Herchenbach, Ruppichteroth, Fed. Rep. of Germany

[73] Assignee: Jean Walterscheid GmbH, Lohmar, Fed. Rep. of Germany

[21] Appl. No.: 124,147

[22] Filed: Feb. 25, 1980

[30] Foreign Application Priority Data

Mar. 1, 1979 [DE] Fed. Rep. of Germany ....... 2908029

[51] Int. Cl.³ .............................................. F16D 3/06
[52] U.S. Cl. .................................... 464/167; 464/169; 464/172
[58] Field of Search ........................... 64/23, 23.5, 23.7

[56] References Cited

U.S. PATENT DOCUMENTS

| 2,695,504 | 11/1954 | Magee | 64/23 |
| 2,696,090 | 12/1954 | Harrington | 64/23 |
| 2,800,004 | 7/1957 | Schroter | 64/23 |
| 3,171,269 | 3/1965 | Gilmore et al. | 64/23 |
| 3,618,340 | 11/1971 | Geisthoff et al. | 64/23 |
| 4,125,000 | 11/1978 | Grob | 64/23 |
| 4,236,388 | 12/1980 | Geisthoff | 64/23 |

Primary Examiner—Ira S. Lazarus
Assistant Examiner—Magdalen Moy
Attorney, Agent, or Firm—Toren, McGeady & Stanger

[57] ABSTRACT

A torque transmitting assembly including three telescopically arranged shafts is formed with an interlocking ball device which releasably axially locks the shaft members together. The ball device may include one or more balls which are movable radially of an intermediate shaft member, with the balls locking the intermediate shaft member with an inner shaft member when the balls are in a radially inward position and releasing said axial interlocking when the balls are permitted to move to a radially outward position by engagement within a recess of the outer of the three shaft members. The inner shaft member is formed with a conically shaped attachment member which operates to tend to urge the ball into the recess to release axial interengagement between the inner and intermediate shaft member and to permit the ball to move along the conical surface thereof back to its radially inward position when said locking engagement is to be re-established. The balls are held within apertures formed in the intermediate shaft member and a spring loaded control ring actuated by the conically shaped attachment member operates to hold the balls in their radially outward position when the shafts are in their telescopically extended state.

6 Claims, 3 Drawing Figures

TRISHAFT TELESCOPING ASSEMBLY FOR TORQUE TRANSMISSION

The present invention relates generally to a torque transmitting assembly and more particularly to an assembly composed of three shafts adapted for telescopic movement relative to each other.

The invention is particularly intended for use in driving agricultural implements. The assembly of the invention is of the type which consists of three hollow members which telescope relative to each other with little play, with at least the two outer members being constructed as sectional tubes and with at least one interlocking ball which locks the axial mobility of the intermediate sectional tube alternately relative to the inner and the outer sectional members. The locking ball is radially movably held in an aperture provided at an end of the intermediate sectional tube or shaft member, with the locking ball being alternately engaged in stop means provided in the inner sectional member and the outer sectional tube, with an end cover being provided which closes the intermediate sectional tube at the end holding the locking ball. The assembly of the type to which the present invention relates also includes a control ring which may be moved toward the aperture by the force of a spring.

A trishaft telescoping assembly adapted to operate as a universal joint and having safety features integrally formed therein is known from German Offenlegungsschrift No. 1,943,837. In this three piece universal joint assembly, an eccentrically arranged rod is provided which is axially movable with the outer and intermediate sectional tube. Both rods at their free ends are provided with a stop and each extends through plates or plugs arranged in the interior of the middle and inner sectional tubes in order to prevent, by means of the resulting stops, the universal joint shaft from becoming extended.

The known universal joint shaft assembly has the disadvantage that the rods arranged in the interior are not located in the axial direction on one axis. This may produce unbalanced conditions during operation at high speeds. Moreover, the aforementioned universal joint assembly has a relatively high weight which produces a negative effect upon its ease of manipulation thereby diminishing its ability to meet requirements particularly for agricultural operation.

The prior art structure previously mentioned involves the further disadvantage that the shaft cannot be completely extended. This results in increased danger of accidents inasmuch as it may frequently happen that an agricultural implement which is drawn by a tractor may be unhitched from the tractor without release of the universal joint shaft coupling. If this should occur, the utilization of a universal joint assembly which cannot be fully extended could result in serious injury to operating personnel when the tractor is started.

Accordingly, the present invention is directed toward the task of providing a tripartite universal joint shaft for the driving mechanism of an agricultural machine wherein the shaft assembly can be fully extended without involving the danger of loss of loose parts and which is capable of performing an alternating locking operation whereby an inner shaft member may be axially locked relative to the intermediate shaft member, on the one hand, and whereby the intermediate shaft member may be locked relative to the outer shaft member on the other hand, with the operating characteristics of the device being unaffected by internal friction occurring during torque transmission.

SUMMARY OF THE INVENTION

Briefly, the present invention may be described as a torque transmitting shaft assembly which is particularly suited for driving agricultural implements comprising an inner, an intermediate and an outer hollow shaft member arranged for telescoping movement relative to each other with aperture means being provided in the intermediate shaft member and with interlocking ball means being held in the aperture means for radially movable engagement thereof in order to effect releasable axial interlocking between the shaft members. The interlocking ball means are movable between a radially inward and radially outward position relative to the intermediate shaft member and the assembly further includes means for maintaining the inner and intermediate shaft members in axially fixed engagement relative to each other when the interlocking ball means are in the radially inward position and for releasing the axially fixed engagement when the ball means move to the radially outermost position. Means are provided for moving the interlocking ball means to the radially outward position when the inner and intermediate shaft members are moved to a predetermined outwardly telescoped position relative to the outer shaft member and means are also provided for moving the ball means to said radially inward position when both the inner and intermediate shaft members are moved beyond said predetermined position telescopically inwardly of the outer shaft member.

More specifically, the assembly is provided with a conically shaped attachment which is arranged at the insertable end of the inner shaft member, the conically shaped attachment including a cylindrical shaft. A conical ring is radially movably held by the force of a spring which biases the conical ring toward the conically shaped attachment with the aperture means in the intermediate shaft member holding the interlocking ball means at its side facing toward its insertable end provided with a radially inwardly directed oblique surface. When the intermediate shaft member is locked relative either to the inner shaft member or to the outer shaft member, the ball means is supported by the oblique surface with the radially inwardly facing half of the ball means.

The design of the aperture means in the intermediate shaft section in accordance with the invention gives rise to a particular advantage in that the locking balls of the interlocking ball means are supported in both locking positions on the inner half of the balls against the direction of extending. Accordingly, when reversing the locking engagement of the intermediate shaft member from the inner shaft member to the outer shaft member, a forced control of the locking balls of the ball means is effected as a result of an outwardly directed radial component acting on the balls. This forced control prevents an overriding of the locking position even when the telescoping shaft is extended rapidly.

On the other hand, when the telescoping shaft is re-engaged, the locking ball or balls of the ball means may move easily into another locking position because the forces now acting are only radially inwardly of the ball.

The design of the three-piece telescoping shaft assembly in accordance with the invention has the additional advantage that, in the case of a mutual locking of the inner shaft member with the intermediate shaft member, the spring loaded conical ring will act continuously with an outwardly directed radial component on the locking ball of the ball means since the latter is held axially only at its inwardly facing half. Due to the fact that the normal force acting from the conical ring on the locking ball or balls extends approximately parallel to the oblique surface, reversal of the locking ball for engagement of the intermediate shaft section with the outer shaft section is advantageously influenced. Due to the fact that the locking ball can perform an albeit slight axial movement when the three-piece telescoping shaft is rapidly extended, the time available for reversal of the operating functions is accordingly increased.

In a further development of the invention, it should be understood that the interlocking ball means may comprise a plurality of locking balls arranged in a uniformly distributed pattern over the circumference of the assembly.

The arrangement of two or more locking balls distributed uniformly over the circumference results in an improved centering of the reversal action.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF PREFERRED EMBODIMENTS

Figure 1:
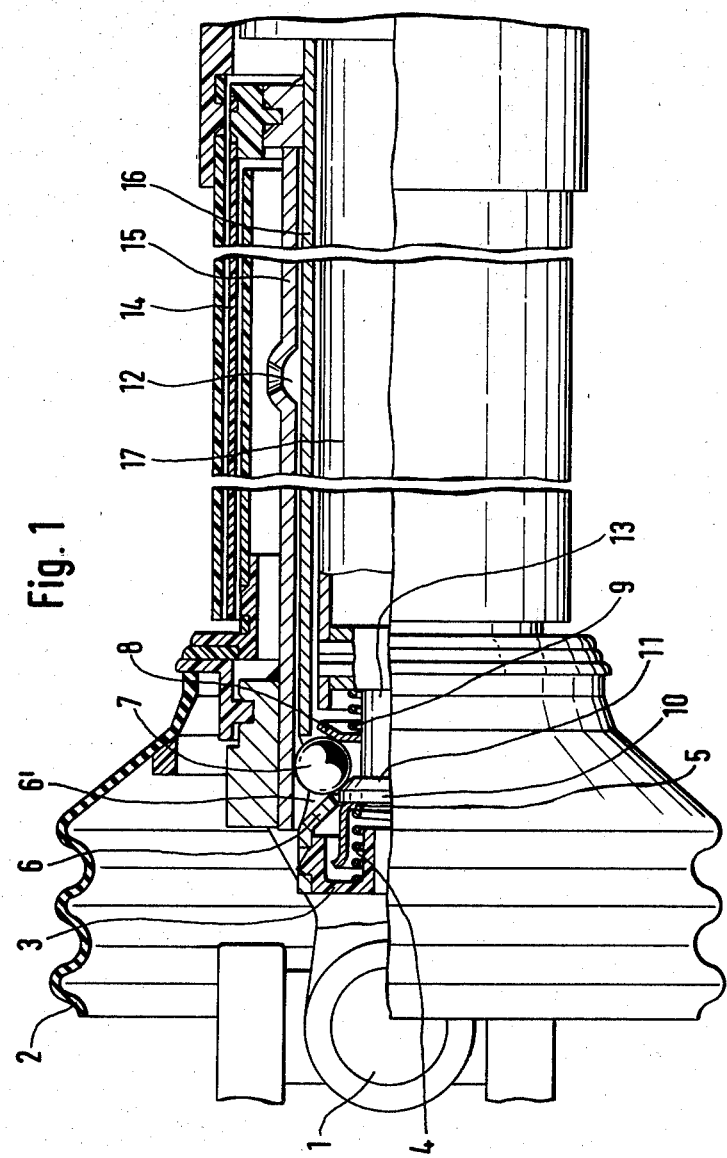
FIG. 1 is a longitudinal sectional view of a telescoping shaft assembly in accordance with the present invention shown in the retracted state.

Referring now to the drawings wherein similar reference characters are used to identify similar parts throughout the figures thereof, there is shown in FIG. 1 a three-piece telescoping shaft assembly shown in the fully retracted state wherein an inner shaft member 17 is axially locked in fixed engagement by means of a locking ball 7 relative to an intermediate shaft member 16. The inner and intermediate shaft members 17, 16 are movable together axially to the right as seen in FIG. 1 relative to an outward shaft member 15.

The assembly includes a conically shaped attachment member 11 which bears against a control ring 5 and which holds the ring 5 in the open position against the force of a spring 4 toward an aperture 6' in the intermediate shaft member 16. The force of a spring 9 acts upon the locking ball 7 through a conical ring 8.

Since the point of contact of the conical ring 8, of a head 10 of the conically shaped attachment 11 and of an oblique surface 6 through which the aperture 6' is formed are on the inwardly located side of the locking ball 7, seen from the center of the assembly, the ball will receive a radially outwardly directed force which will be absorbed by the wall of the outer shaft member 15.

When a first extending movement of the three-piece telescoping shaft occurs, the inner shaft member 17 and the intermediate shaft member 16 will be jointly extracted to the right outwardly from the outer shaft member 15 due to the locked condition of the inner and intermediate shaft members 17, 16.

As soon as the inner and intermediate shaft members 17, 16 reach a predetermined position relative to the outer shaft member 15 where the locking ball 7 is axially aligned with a recess 12 formed in the outer shaft member 15, a radial force component acting on the locking ball 7 will become effective and the locking ball 7 will engage within the recess 12. In this position, the locking ball will be locked against further outward movement by the normal force generated at the point of contact of the locking ball with the oblique surface 6. This position of the locking ball 7 engaged within the recess 12 is shown in FIG. 2.

Figure 2:
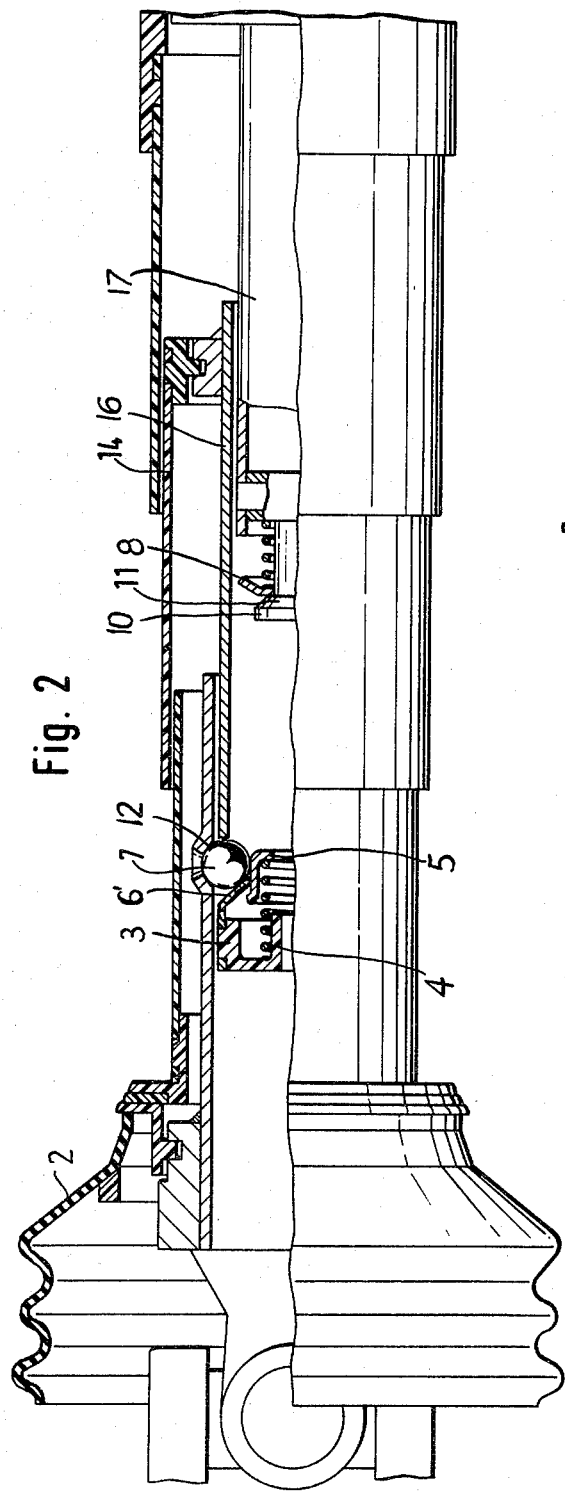
FIG. 2 is a longitudinal sectional view of the assembly of FIG. 1 shown in an extended state.

Accordingly, it will be seen that in the operation of the telescoping shaft assembly of the invention, the locking ball 7 is moved between a radially inward position shown in FIG. 1 and a radially outward position shown in FIG. 2.

Since the aperture 6' widens outwardly because of the oblique surface 6, the time available for reversal of the locking ball is increased so that a trouble free reversal may be possible even when the telescoping shaft is extended rapidly.

As soon as the locking ball 7 has fully moved into the recess 12 of the outer shaft member 15, the head of the conically shaped attachment 11 may be pulled through beneath the locking ball 7 thus releasing the control ring 5 so that the ring 5 is moved under the aperture 6' as a result of the force of the spring 4 which, with its other end, is supported by an end cover 3 on the intermediate tube or shaft 16. Consequently, the control ring 5 will prevent the locking ball 7 from falling inwardly when the inner shaft member or tube 17 is further extended.

Therefore, it will be seen that the inner shaft member 17 may be fully extended in a telescoping manner out of the telescoping shaft assembly without the danger of loss of any of the individual parts of the assembly (FIG. 2).

When the inner shaft member 17 is re-engaged with the intermediate shaft member 16, initially the head 10 of the conically shaped attachment 11 will run against the control ring 5 and, when the inner shaft member 17 is retracted further, the attachment 11 will push the control ring 5 against the force of the spring 4 out of the locking position whereby the locking ball 7 will be able to move back to the radially inwardly position shown in FIG. 1. In so doing, because of the axial force acting from the inner shaft member 17 through the middle or intermediate shaft member 16 on the locking ball 7 the locking ball 7 will be subjected to a radially inwardly directed force component.

In the direction of retracting of the assembly, the intermediate shaft member 16 acts upon the locking ball 7 at or about the middle of the ball so that this will not result in a radial component which could act against the reversing movement of the locking ball 7. The ball 7 pushes the conical ring 8 against the retracting direction on the cylindrical shaft 13 of the conically shaped attachment 11. As a result, locking of the outer shaft member 15 relative to the intermediate shaft member 16 is cancelled or eliminated and the locking of the intermediate shaft member 16 relative to the inner shaft member 17 will be reinstated so that both will again move together in the axial direction.

Figure 3:
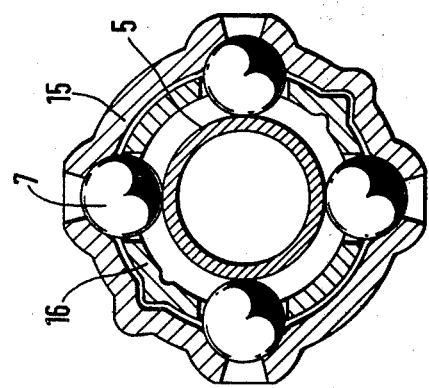
FIG. 3 is a cross-sectional view taken through a telescoping shaft assembly in accordance with the invention wherein four locking balls are uniformly distributed over the circumference of the shaft assembly.

It will be understood that the device of the present invention may utilize a single ball 7 as the interlocking ball means thereof. However, FIG. 3 shows a three-piece telescoping shaft in cross-section wherein four locking balls 7 are utilized with the balls 7 being uniformly distributed around the circumference of the device and arranged to hold the locking position of the intermediate shaft member 16 relative to the outer shaft member 15.

The three-piece telescoping universal joint shaft assembly is usually provided at its end with universal joints 1 which are surrounded by protective means such as resilient boots 2 which, in turn, are supported on the universal joint assembly together with protective tubes 14 which cover the universal joint assembly in the longitudinal position in order to avoid damage or accidents.

While specific embodiments of the invention have been shown and described in detail to illustrate the application of the inventive principles, it will be understood that the invention may be embodied otherwise without departing from such principles.

What is claimed is:

1. A torque transmitting shaft assembly particularly suited for driving agricultural implements comprising: an inner hollow shaft member, an intermediate hollow shaft member and an outer hollow shaft member arranged for telescoping movement relative to each other; aperture means in said intermediate shaft member; interlocking ball means held in said aperture means in radially movable engagement for effecting releasable axial interlocking engagement between said inner, said outer and said intermediate shaft members; stop means having said ball means alternately engaging therein provided on said inner shaft member and said outer shaft member; cover means provided on said intermediate shaft member at an end thereof having said ball means; locking ring means adapted to be moved toward said aperture means by first spring means; conically shaped attachment means including a shaft portion extending axially from a conically shaped head thereof provided at a telescopically innermost end of said inner shaft member; a conical ring member axially movably mounted on said shaft portion; and second spring means biasing said ring member on said shaft portion in a direction toward said conically shaped head; said aperture means being provided at a side thereof with radially inwardly facing oblique surface means; said interlocking ball means having a radially inwardly facing side bearing against said oblique surface means upon locking of said intermediate shaft member relative to said inner shaft member and relative to said intermediate shaft member.

2. A shaft assembly according to claim 1 wherein said interlocking ball means comprise a plurality of balls circumferentially spaced about said assembly.

3. A torque transmitting shaft assembly comprising: an inner hollow shaft member, an intermediate hollow shaft member and an outer hollow shaft member arranged for telescoping movement relative to each other; aperture means in said intermediate shaft member; interlocking ball means held in said aperture means in radially movable engagement for effecting releasable axial interlocking engagement between said inner, said outer and said intermediate shaft members; said interlocking ball means being movable between radially inward and radially outward positions relative to said intermediate shaft member; means for maintaining said inner and intermediate shaft members in axially fixed engagement relative to each other when said interlocking ball means is in said radially inward position; means for releasing said axially fixed engagement when said ball means moves to said radially outward position; means for moving said interlocking ball means to said radially outward position when said inner and intermediate shaft members are moved to a predetermined outwardly telescoped position relative to said outer shaft member; and means for moving said ball means to said radially inward position when both said inner and intermediate shaft members are moved beyond said predetermined position telescopically inward of said outer shaft member; said inner shaft member including a conically shaped attachment member on a telescopically inner end thereof, said interlocking ball means being held between said conically shaped attachment member and the inner surface of said outer shaft member within said aperture means when said interlocking ball means is at the radially inward position thereof; said assembly further including conical ring means arranged for spring biased axial movement on said inner hollow shaft member and having a conical surface adapted to engage said interlocking ball means on the side thereof opposite the side upon which said interlocking ball means are engaged by said conically shaped attachment means when said interlocking ball means are in said radially inward position.

4. A shaft assembly according to claim 3 wherein said means for moving said interlocking ball means to said radially outward position include recess means formed on an inner surface of said outer shaft member.

5. A shaft assembly according to claim 3 further including spring biased control ring means axially movable relative to said intermediate shaft member adapted to be brought to a position radially inwardly of said interlocking ball means to hold said interlocking ball means in said radially outward position when said inner and intermediate shaft members are moved to said predetermined position relative to said outer shaft member.

6. A shaft assembly according to claim 5 wherein said conically shaped attachment member operates to move said control ring means axially against the spring biasing force applied thereto out of engagement with said interlocking ball means to permit said interlocking ball means to move to said radially inward position when said inner shaft member is moved telescopically inwardly beyond said predetermined position.

* * * * *